3,099,599
METHOD FOR TREATING INFESTATIONS
OF NEMATODES
Frederick Charles Copp and Harold Francis Hodson, London, England, assignors to Burroughs Wellcome & Co. (U.S.A.), Inc., Tuckahoe, N.Y., a corporation of New York
No Drawing. Filed Feb. 14, 1961, Ser. No. 89,125
Claims priority, application Great Britain Mar. 3, 1960
11 Claims. (Cl. 167—53)

The present invention relates to alkyl guanidines and to the methods of using them.

It has been found the acid addition salts of the phenoxyalkylguanidines for Formula I have a specific sympatholytic action due to the depression of the adrenergic patholytic action due to the depression of the adrenergic nerve mechanism and not due to a direct antagonism of adrenaline and its congeners, and are free or relatively free from parasympatholytic and parasympathomimetic properties. It has also been found that the acid addition salts of the phenoxyalkylguanidines of Formula I effectively decrease infestations of *Strongyloides ratti* in rats and *S. papillosus* in sheep.

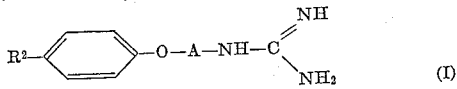

In Formula I:

A is a

—(CH$_2$)$_2$—, —CH$_2$.CH(CH$_3$)—

—CH(CH$_3$).CH$_2$— or —(CH$_2$)$_3$— group;

R$^2$ is a hydrogen or halogen atom or an alkyl group containing from one to six carbon atoms or an acetamido or propionamido group; and The phenoxy ring carries in each of the 2, 3, 5 and 6 positions a hydrogen or halogen atom or a nitro group or an alkyl or alkoxy group containing from one to four carbon atoms.

The specific sympatholytic action and the anthelmintic action of the acid addition salts of the phenoxyalkylguanidines of Formula I reside in the bases, but the acid is preferably therapeutically and pharcameutically acceptable. Thus, hydrochloric, hydrobromic and sulphuric acids are satisfactory; however, in certain circumstances organic acids such as lactic, citric and maleic acids offer specific advantages because of the physical properties of the salts so formed.

According to the present invention in one aspect, there are provided the acid addition salts of the phenoxyalkylguanidines of Formula I.

According to the present invention in another aspect, there is provided a method for the treatment of hypertension which comprises the administration of an acid addition salt of phenoxyalkylguanidine of Formula I. The preferred acid addition salts of the phenoxyalkylguanidines of Formula I contain a 2-(4-bromophenoxy)-, 2-(2-methylphenoxy)-, 2-(2-isopropylphenoxy)-, 2-(2,4,6-trichlorophenoxy)-, isopropyl-5-methylphenoxy)-, 2-(3-methylphenoxy)-, 2-(4-chloro-2-(2-bromophenoxy)-, 2-(2,4-dichlorophenoxy)-, 2-(2,6-dichlorophenoxy)-, 2-(2-chloro-6-methylphenoxy)- and 2-(2,6-dimethylphenoxy)-ethylguanidine or a 2-(2,6-dimethylphenoxy)-propylguanidine base. Especially preferred are acid addition salts of the last eight named phenoxyalkylguanidine bases.

According to the present invention in a further aspect, there is provided a method for the treatment of infestations of nematodes, especially of *Strongyloides* such as *S. papillosus* in sheep and *S. stercoralis*, which comprises the administration of an acid addition salt a phenoxyalkylguanidine of Formula I. The preferred acid addition salts of the phenoxyalkylguanidines of Formula I contain a 2-(2-chlorophenoxy)-, 2-(4-chloro-3-methylphenoxy)-, 2-(2-isopropylphenoxy)-, 2-(2-methylphenoxy)-, 2-(4-methylphenoxy)-, 2-(3-chloro-4-methylphenoxy)-, 2-(4-chloro-3,5-dimethylphenoxy)-, 2-(2-isopropyl-5-methylphenoxy)-, 2-(4-chloro-2-isopropyl-5-methylphenoxy)- and 2-(4-t-pentylphenoxy)-ethylguanidine base. Especially preferred are acid addition salts of the last seven named phenoxyalkylguanidine bases.

The acid addition salts of the phenoxyalkylguanidines of Formula I are synthesised by any method known for synthesising derivatives of guanidine. For example, they are synthesised by the reaction of a guanidine salt with a compound R$^3$X, wherein R$^3$ is a phenoxyalkyl group and X is a reactive atom or group, such as a halogen atom. As a further example, they are also synthesised by the reaction of ammonia or an ammonia derivative or a salt thereof with an S-substituted thiouronium salt or with a cyanamide; the ammonia derivative may be a primary amine, and the salt of ammonia may be ammonium sulphate, thiocyanate or benzenesulphonate.

The acid addition salts of the phenoxyalkylguanidines of Formula I produced by the above described reactions may be converted by double decomposition either during or after the reactions into other salts. For example, the hydrochlorides may be prepared from the iodides or sulphates by reaction with silver chloride or by warming with methanolic hydrogen chloride.

The acid addition salts of the phenoxyalkylguanidines of Formula I may be presented in pharmaceutical preparations made by any of the methods known to pharmacy. For oral administration, fine powders or granules of the salt may contain diluents and dispersing and surface active agents, and may be presented in a draft or drench in water or in a syrup; in capsules or cachets in the dry state or in a non-aqueous suspension, when a suspending agent may be included; or in a suspension in water or a syrup or an oil, or in a water/oil emulsion, when flavouring, preserving, suspending, thickening and emulsifying agents may be included; the granules or the tablets may be coated. For parenteral administration the salt may be presented in aqueous or non-aqueous injection solutions or suspensions which may contain diluents, dispersing and surface active agents, binders, lubricants, antioxidants, buffers, bacteriostats, agents which solubilise a relatively insoluble salt, and solutes which render the compounds isotonic with the blood. The salts may be also presented in food, or in suppositories or pessaries by incorporation in a suppository base.

The preferred forms of presentation for a specific sympatholytic action are tablets and injection solutions. The dose range of the acid addition salt of a phenoxyalkylguanidine of Formula I suitable for administration depends on a number of variable factors, such as the activity and toxicity of the particular salt and of the particular base, the mode and frequency of administration of the salt, and the method of making the pharmaceutical composition. The dose range is, however, between 10 mg. and 1.0 g.; for continuous medication, dosing two or three times a day may be desirable.

The preferred forms of presentation for an anthelmintic action are tablets, drafts and drenches. The dose range, again, depends on a number of variable factors such as those described above, but is, however, between 100 mg. and 3.0 g.; again, for continuous medication, dosing two or three times a day may be desirable.

The invention will now be described with reference to the following examples, in which all temperatures are given in degrees centigrade.

Example 1

A mixture of 1-bromo-2-(4-chloro-2-isopropyl-5-methylphenoxy)ethane (102 g.) and potassium phthalimide (70 g.) in dimethylformamide (50 ml.) was stirred and heated in an oil-bath. The bath temperature was raised slowly to 140° and maintained at that temperature for thirty minutes. The reaction mixture was poured into water, the mixture allowed to stand at room temperature for one hour, and the precipitated solid removed and dried. One recrystallisation from a mixture of ethanol and water gave the phthalimide derivative, melting point 83–86°.

A solution of the phthalimide derivative (107 g.) in boiling ethanol (750 ml.) was treated with hydrazine hydrate (38 ml.), and the solution heated to reflux. A voluminous white precipitate formed during the first five minutes of heating. After heating for three hours the mixture was treated cautiously with concentrated hydrochloric acid (80 ml.), heated on a steam-bath for fifteen minutes, and then cooled and filtered. The precipitate was washed well with water and the combined filtrate and washings evaporated under reduced pressure to remove most of the ethanol. The residue was diluted with water, made strongly basic with sodium hydroxide, and the precipitated oil isolated with ether in the usual manner, to give 1-amino-2-(4-chloro-2-isopropyl-5-methylphenoxy)ethane, boiling point 109–113°/0.09 mm.

This amine (50 g.) was treated with a solution of S-methylthiouronium sulphate (30 g.) in hot water (100 ml.); the mixture was diluted with ethanol (40 ml.) and the resulting solution heated under reflux for two hours, by which time evolution of methane thiol had ceased. The mixture was allowed to stand at 0° for one hour and the crystalline product was removed, washed with a little water and then with ether, and dried in vacuo. One recrystallisation from a mixture of ethanol and water gave pure 2 - (4 - chloro - 2 - isopropyl - 5 - methylphenoxy)ethylguanidine sulphate, melting point 234–236°.

*Example 2*

A mixture of 1-bromo-2-(2-isopropyl-5-methylphenoxy)ethane (37 g.) and potassium phthalimide (30 g.) in dimethylformamide (20 ml.) was caused to react as described in the first part of Example 1, to give the phthalimide derivative which was converted to 1-amino-2-(2-isopropyl-5-methylphenoxy)ethane, boiling point 152–156°/12 mm.

This amine (5.03 g.) was treated with a solution of S-methylthiouronium sulphate (3.62 g.) in water (10 ml.) and the mixture warmed on the steam-bath for two hours and allowed to cool. The crystalline product was removed and twice recrystallised from a mixture of ethanol and water to give pure 2-(2-isopropyl-5-methylphenoxy)-ethylguanidine sulphate, melting point 221–222°.

*Example 3*

Essentially as described in Examples 1 and 2, 1-bromo-2-(2-chlorophenoxy)ethane was converted to 1-amino-2-(2-chlorophenoxy)ethane, boiling point 150–153°/18 mm. and thence to 2-(2-chlorophenoxy)ethylguanidine sulphate, melting point 238°.

*Example 4*

Essentially as described in Examples 1 and 2, 1-bromo-2-(2-isopropylphenoxy)ethane was converted to 1-amino-2-(2-isopropylphenoxy)ethane, boiling point 72–74°/0.02 mm. and thence to 2-(2-isopropylphenoxy)ethylguanidine sulphate, melting point 206°.

*Example 5*

A mixture of 4-chloro-3-methylphenol (100 g.) and 1,2-dibromoethane (158.2 g.) in water (160 ml.) was stirred and heated to reflux during the slow dropwise addition of a solution of sodium hydroxide (30.8 g.) in water (140 ml.). Stirring and heating were continued for a total of six hours, and the mixture cooled and extracted exhaustively with ether. The ethereal extract was washed exhaustively with 5 N-sodium hydroxide, dried over potassium carbonate, filtered and evaporated. The residual oil was distilled under reduced pressure to give 1-bromo-2-(4-chloro-3-methylphenoxy)ethane, boiling point 106–112°/0.65 mm.

A mixture of this ethane (40 g.) and potassium phthalimide (29.7 g.) in dimethylformamide (30 ml.) was caused to react in the usual manner to give the phthalimide derivative, melting point 138°, which was converted to 1-amino-2-(4-chloro-3-methylphenoxy)ethane, boiling point 97–99°/0.2 mm.

This amine (6 g.) was treated with a solution of S-methylthiouronium sulphate (4.5 g.) in water (45 ml.) and the mixture was on a steam-bath for two-hours. The crystalline product which separated on cooling was recrystallised from a mixture of ethanol and water to give pure 2-(4-chloro-3-methylphenoxy)ethylguanidine sulphate, melting point 203°.

*Example 6*

A mixture of 4-t-pentylphenol (19 g.) and 1,2-dibromoethane (26.1 g.) in water (26 ml.) was stirred and heated to reflux during the dropwise addition of a solution of sodium hydroxide (5.1 g.) in water (12 ml.). Stirring and heating were continued for a total of six hours and the mixture worked up as in the first part of Example 1, to give 1-bromo-2-(4-t-pentylphenoxy)ethane, boiling point 108–114°/0.08 mm. This ethane was converted to the primary amine as in Examples 1 to 5 with the exception that the intermediate phthalimide derivative was not obtained crystalline.

1-amino-2-(4-t-pentylphenoxy)ethane boiled at 101–102°/0.04 mm. and was caused to react with S-methylthiouronium sulphate in the usual manner to give 2-(4-t-pentylphenoxy)ethylguanidine sulphate, melting point 262–264°, after three recrystallisations from a mixture of ethanol and water.

*Example 7*

By the reaction sequency of Example 5, 3-chloro-4-methylphenol was converted to 1-bromo-2-(3-chloro-4-methylphenoxy)ethane, boiling point 168–171°, which was converted, via the phthalimide derivative, melting point 130–133°, to 1-amino-2-(3-chloro-4-methylphenoxy)ethane, boiling point 152–154°/14 mm.

This amine was reacted with S-methylthiouronium sulphate to give 2-(3-chloro-4-methylphenoxy)ethylguanidine sulphate, melting point 196–198°, after one recrystallisation from a mixture of ethanol and water.

*Example 8*

Thionyl chloride (26 g.) was slowly added to 2-(3-methylphenoxy)propionic acid (30 g.). After standing at room temperature for 30 minutes, the resulting mixture was heated on a steam-bath for 3 hours and finally distilled in vacuo to give 2-(3-methylphenoxy)propionyl chloride, boiling point 126–132°/18 mm.

This chloride (30.5 g.) was gradually added to ice-cooled aqueous ammonia ($d=0.880$, 155 ml.) during a period of 30 minutes. The final mixture was allowed to warm to room temperature, and the insoluble product was filtered off and recrystallised from isopropanol to give 2-(3-methylphenoxy)propionamide, melting point 132–133°. A solution of this amide (9 g.) in dry tetrahydrofuran (200 ml.) was added slowly to a suspension of lithium aluminium hydride (3.8 g.) in dry ether. The final mixture was heated to reflux for 5½ hours; after cooling in ice it was treated slowly with ethyl alcohol (5 ml.) and then with 10 N-sodium hydroxide solution. The ethereal layer was decanted off from the inorganic paste, dried over solid potassium hydroxide, filtered and evaporated. The residual 2-(3-methylphenoxy)propylamine was distilled in vacuo, boiling point 128–130°/17 mm.

This amine (4.8 g.) was added to a solution of S-methylthiouronium sulphate (8.1 g.) in water (50 ml.). The resulting mixture was stirred at 45° for 9 hours and at 60–70° for 5 hours; it was then evaporated in vacuo. The residue was extracted with boiling ethanol (25 ml.), and the insoluble portion filtered off. The filtrate was kept at 0° for 48 hours, when a crystalline solid separated. This was collected and recrystallised from ethanol and then from a mixture of ethanol and isopropanol (1:1) to give 2-(3-methylphenoxy)propylguanidine sulphate, melting point 137–139°.

*Example 9*

1-amino-2-(3-methylphenoxy)ethane (10 g.) was treated with a solution of S-methylthiouronium sulphate (9.2 g.) in water (65 ml.), and the mixture heated on a steam-bath during 2½ hours. The crystalline material which separated on cooling was removed and twice recrystallised from a mixture of ethanol and water to give pure 2-(3-methylphenoxy)ethylguanidine sulphate, melting point 187°.

*Example 10*

1-amino-2-(4-chlorophenoxy)ethane (5.14 g.) was treated with a solution of S-methylthiouronium sulphate (4.17 g.) in water (20 ml.). The mixture was heated on a steam-bath during 2 hours, allowed to cool, and the crystalline reaction product was removed and dried. Two recrystallisations from a mixture of ethanol and water gave pure 2-(4-chlorophenoxy)ethylguanidine sulphate, melting point 226–227°.

*Example 11*

A mixture of 1-bromo-2-(4-bromophenoxy)ethane (14.0 g.) and potassium phthalimide (8.23 g.) in dimethylformamide (8 ml.) was stirred and heated in an oil-bath. The bath temperature was maintained at 180° during 3 hours and the reaction mixture cooled, poured into an excess of water, and extracted exhaustively with chloroform. The combined, dried (potassium carbonate) organic extracts were evaporated to dryness and the residue was recrystallised from propan-2-ol to give the phthalimide derivative, melting point 164–168°.

A suspension of the phthalimide derivative (9.8 g.) in boiling ethanol (300 ml.) was treated with hydrazine hydrate (3.6 ml.) and the mixture heated under reflux during 5 hours. During the first 10 minutes of heating the phthalimide derivative dissolved completely and a voluminous white precipitate was formed. The reaction mixture was made just acid with 5 N-hydrochloric acid, heated on a steam bath for a few minutes, cooled and filtered. The filtrate was evaporated under reduced pressure to small volume, made strongly basic with sodium hydroxide and the product isolated with ether in the usual manner. The pure 1-amino-2-(4-bromophenoxy)ethane boiled at 156–158°/10 mm.

This amine (2.5 g.) was treated with a solution of S-methylthiouronium sulphate (1.6 g.) in hot water (10 ml.) and the mixture warmed on a steam-bath. Vigorous evolution of methane thiol ensued and the mixture became homogeneous. Heating was continued for 1½ hours, the solution cooled, and the crystalline reaction product removed and dried in vacuo. Two recrystallisations from a mixture of methanol and water gave pure 2-(4-bromophenoxy)ethylguanidine sulphate, melting point 228–230° (sinters at 224°).

*Example 12*

A mixture of 1-bromo-2-(2,4,6-trichlorophenoxy)ethane (24.3 g.) and potassium phthalimide (14.16 g.) in dimethylformamide (15 ml.) was converted, by the method of the first part of Example 3, via the phthalimide derivative, melting point 100–101°, to 1-amino-2-(2,4,6-trichlorophenoxy)ethane, boiling point 174–176°/13 mm.

This amine (4.0 g.) was treated with a solution of S-methylthiouronium sulphate (2.32 g.) in water (12 ml.). The mixture was heated on a steam-bath when it became homogeneous and then began to deposit a crystalline solid. Heating was continued for 2 hours, the solution cooled and the reaction product removed and dried. Two recrystallisations from a mixture of methanol and water gave pure 2-(2,4,6-trichlorophenoxy)ethylguanidine sulphate, melting point 215–217°.

*Example 13*

A solution of 1-bromo-2-(4-methylphenoxy)ethane (150 g.) in methanol (300 ml.) containing ammonia (60 g.) was heated in an autoclave for five hours at 100°. The reaction mixture was evaporated under reduced pressure to low volume, the residue treated with excess aqueous sodium hydroxide, and the precipitated oil isolated with ether in the usual way. Distillation under reduced pressure gave 1-amino-2-(4-methylphenoxy)ethane, boiling point 135–140°/14 mm.

This amine (10.06 g.) was treated with a solution of S-methylthiouronium sulphate (9.26 g.) in water (50 ml.). The resulting mixture was heated on the steam-bath for 1½ hours by which time evolution of methane thiol had ceased. The colourless crystalline solid which separated from the cooled reaction solution was recrystallised three times from a mixture of ethanol and water to give pure 2-(4-methylphenoxy)ethylguanidine sulphate, melting point 195–196°.

*Example 14*

A solution of 1-bromo-2-(2-methylphenoxy)ethane (107.5 g.) in methanol (212 ml.) containing ammonia (42.5 g.) was heated in an autoclave for six hours at 100°. The reaction mixture was worked up as described in the first part of Example 13 to give 1-amino-2-(2-methylphenoxy)ethane, boiling point 130–134°/16 mm.

This amine (10.0 g.) was treated with a solution of S-methylthiouronium sulphate (9.3 g.) in hot water (20 ml.) and the resulting mixture heated on the steam-bath for 4 hours. On cooling, the solution immediately deposited a colourless crystalline solid, which was recrystallised three times from a mixture of ethanol and water to give pure 2-(2-methylphenoxy)ethylguanidine sulphate, melting point 216–217°.

*Example 15*

A mixture of 4-chloro-3,5-dimethylphenol (100 g.) and 1,2-dibromoethane (149 g.) in ethanol (150 ml.) was stirred and heated to reflux during the slow dropwise addition of a solution of sodium hydroxide (29 g.) in water (130 ml.). Heating and stirring were continued for a total of six hours; the mixture was then cooled, evaporated to remove most of the ethanol, diluted with water and extracted exhaustively with ether. The dried ethereal extract yielded an oil which was distilled under reduced pressure to give 1-bromo-2-(4-chloro-3,5-dimethylphenoxy)ethane, boiling point 108–112°/0.04 mm.

A mixture of this bromide (47.5 g.) and potassium phthalimide (36.6 g.) in dimethylformamide (15 ml.) was stirred and heated to 140° for thirty minutes and the reaction mixture was worked up in the usual manner. The resulting phthalimide derivative, melting point 144–145°, was converted, as in the previous examples, to 1-amino-2-(4-chloro-3,5-dimethylphenoxy)ethane, boiling point 167–170°/14 mm.

This amine (6.0 g.) was treated with a solution of S-methylthiouronium sulphate (4.17 g.) in water (15 ml.); ethanol (2 ml.) was added and the resulting solution was heated to reflux for two hours. The solid which separated from the cold reaction mixture was removed and twice recrystallised from a mixture of ethanol and water to give 2-(4-chloro-3,5-dimethylphenoxy)ethylguanidine sulphate, melting point 235–240°.

*Example 16*

A mixture of 1-bromo-2-(2,6-dimethylphenoxy)ethane (16.2 g.) and potassium phthalimide (12.7 g.) in dimethylformamide (14 ml.) was stirred and heated in an oil-bath. The bath temperature was raised slowly to 140° and maintained at this temperature for thirty minutes. The cooled mixture was treated with water (100 ml.) and the precipitated oil extracted with ether. The dried (potassium carbonate) ethereal extract yielded a semi-crystalline mass which crystallised from aqueous ethanol to give the phthalimide derivative.

A solution of the phthalimide derivative (10.2 g.) in ethanol (60 ml.) was treated with hydrazine hydrate (5 ml.) and the mixture heated to reflux for three hours. A voluminous crystalline precipitate formed during the first ten minutes of heating. The cooled mixture was filtered, the residue washed with a little ethanol, and the combined filtrate and washings evaporated under reduced pressure. The residue was distributed between 2 N-hydrochloric acid (30 ml.) and ether (50 ml.), and the ethereal layer was discarded. The acid aqueous portion was made strongly basic with sodium hydroxide, and the precipitated oil isolated with ether in the usual manner, to give 1-amino - 2 - (2,6 - dimethylphenoxy)ethane, boiling point 61–62°/0.05 mm.

This amine (2.0 g.) was treated with a warm solution of S-methylthiouronium sulphate (1.68 g.) in water (6 ml.). The mixture was warmed gently on a steam-bath, with swirling; methane thiol was evolved and at 50° the mixture became homogeneous. The resulting solution was heated to 70° for a further 1½ hours, cooled, and the crystalline precipitate removed and dried in vacuo. One recrystallisation from a mixture of water and propan-2-ol gave 2-(2,6-dimethylphenoxy)-ethylguanidine sulphate as colourless plates, melting point 235–238°.

Example 17

2,6-dimethylphenol (183 g.) was added to a solution of sodium (34.5 g.) in ethanol. The resulting dark-coloured mixture was heated on a steam-bath and stirred during the gradual addition of ethyl 2-bromopropionate (271.5 g.) over a period of 90 minutes. The final mixture was heated to reflux for a further hour, cooled and poured into water. The precipitated oil was extracted with ether in the usual way and the ethereal solution washed exhaustively with cold 2 N-sodium hydroxide to remove unchanged 2,6-dimethylphenol. The residual ethereal solution was dried over potassium carbonate, filtered and evaporated. The residue was distilled in vacuo to give ethyl 2-(2,6-dimethylphenoxy) propionate, boiling point 90–91°/0.25 mm.

This ester (80 g.) was added slowly to a suspension of lithium aluminium hydride (7.6 g.) in dry ether (300 ml.). The addition was completed in 2 hours, and the final mixture heated to reflux for a further 15 minutes. It was cooled in ice and decomposed with ethyl acetate (25 ml.). Water (25 ml.) was slowly added, followed by concentrated hydrochloric acid (25 ml.). The ethereal layer was decanted from the aqueous portion which was re-extracted with fresh ether. The combined ethereal extracts were washed with water, dried over potassium carbonate, filtered and evaporated. The residue was distilled in vacuo to give 2-(2,6-dimethylphenoxy)propan-1-ol.

This alcohol (55.3 g.) was cooled in ice and stirred whilst phosphorus tribromide (49.8 g.) was slowly added. The resulting mixture was stood at room temperature for 48 hours and finally heated on a steambath for 90 minutes. It was then cooled and poured onto ice. The precipitated oil was isolated with ether to give 1-bromo-2-(2,6-dimethylphenoxy)propane, boiling point 132–135°/14 mm.

A solution of this bromide (24.3 g.) in alcoholic ammonia (12% w./v.; 250 ml.) was heated in an autoclave for 6 hours (at 110°). The reaction mixture was evaporated and excess 5 N-sodium hydroxide added to the residue. The separated oil, 1-amino-2-(2,6-dimethylphenoxy)propane, was isolated with ether and distilled in vacuo, boiling point 126–128°/13 mm.

This amine (1.8 g.) was added to a solution of S-methylthiouronium sulphate (1.9 g.) in water (10 ml.). The mixture was stirred at 30–40° for 6 hours and finally at 60° for 1 hour. On cooling and scratching the separated oil crystallised to give 2-(2,6-dimethylphenoxy)propylguanidine sulphate, which was filtered off, washed with a little fresh water and crystallised once from a mixture of ethanol and ether, and then from a mixture of water and ethanol (4:1), melting point 200–201°.

Example 18

2,6-dichlorophenol (72.5 g.) in ethanol (600 ml.) was added to a solution of sodium (10.4 g.) in ethanol (250 ml.). Ethylene dibromide (187 g.) was added and the resulting mixture heated to reflux for seven hours. The bulk of the ethanol was removed by evaporation under reduced pressure, water added to the residue, and the precipitated oil extracted with ether. The ethereal extract was washed exhaustively with 5 N-sodium hydroxide, dried over anhydrous potassium carbonate, filtered and evaporated. The residual oil was distilled under reduced pressure to give 1-bromo-2-(2,6-dichlorophenoxy)ethane, boiling point 157–160°/11 mm.

A mixture of this ethane (29.7 g.) and potassium phthalimide (18.5 g.) in dimethylformamide (10 ml.) was stirred and heated in an oil-bath. The bath temperature was raised slowly to 140° and maintained at that temperature for thirty minutes. The cooled mixture was treated with water and extracted exhaustively with chloroform. The combined, dried (potassium carbonate) chloroform extracts were evaporated under reduced pressure and the residue recrystallised from a mixture of ethanol and water to give the phthalimide derivative, melting point 120–121°.

A solution of the phthalimide derivative (17.0 g.) in hot ethanol (100 ml.) was treated with hydrazine hydrate (1.5 g.) and the mixture heated to reflux for three hours. A voluminous white precipitate formed during the first ten minutes of heating. The mixture was then treated cautiously with concentrated hydrochloric acid until acid to litmus, heated on a steam-bath for fifteen minutes, cooled and filtered. The precipitate was with a little water and the combined filtrate and washings under reduced pressure to remove most of the ethanol. The residue was dilute with water, made strongly basic with sodium hydroxide and the precipitated oil was isolated with ether in the usual manner to give 1-amino-2-(2,6-dichlorophenoxy)ethane, boiling point 140–140°/10 mm.

This amine (3.5 g.) was treated with a solution of S-methylthiouronium sulphate (2.35 g.) in warm water (20 ml.). The mixture was warmed to 70°; methane thiol was evolved and after ten minutes the mixture became homogeneous. The resulting solution was maintained at 70° for a total time of two hours, stored in the cold-room overnight, and the crystalline reaction product removed and dried in vacuo. One recrystallisation from a mixture of methanol and water gave pure 2-(2,6-dichlorophenoxyethyl)guanidine sulphate as colourless prisms, melting point 199–201°.

Example 19

A mixture of 1-bromo-2-(2-bromophenoxy)ethane (46.2 g.) and potassium phthalimide (27.8 g.) in dimethylformamide (15 ml.) was converted, by the method of the second part of Example 18, via the phthalimide derivative, melting point 100–101°, to 1-amino-2-(2-bromophenoxy)ethane, boiling point 158–159°/15 mm.

1-amino-2-(2-bromophenoxy)ethane (2.48 g.) was treated with a solution of S-methylthiouronium sulphate (1.6 g.) in water (12 ml.) and the mixture heated on a steam-bath during one hour. The crystalline material which separated on cooling was removed and recrystallised from a mixture of methanol and water to give pure 2-(2-bromophenoxy)ethylguanidine sulphate, melting point 237°.

Example 20

A mixture of 1-bromo-2-(2,4-dichlorophenoxy)ethane (14.27 g.) and potassium phthalimide (9.8 g.) in dimethylformamide (10 ml.) was caused to react as in the second part of Example 18 to give 1-amino-2-(2,4-dichlorophenoxy)ethane, boiling point 163–166°/15 mm.

This amine (2.06 g.) was treated with a solution of S-methylthiouronium sulphate (1.39 g.) in water (8 ml.) and the resulting mixture heated on a steam-bath during one hour. The crystalline material which separated on cooling was twice recrystallised from ethanol to give pure 2-(2,4-dichlorophenoxy)ethylguanidine sulphate, melting point 217–218°.

Example 21

1-amino-2-(4-chloro-2-methylphenoxy)ethane (6.5 g.) was treated with a solution of S-methylthiouronium sulphate (4.88 g.) in hot water (12 ml.). The mixture was warmed on the steam-bath, treated with ethanol until homogeneous, and then heated under reflux for 2 hours. The product which separated from the cooled mixture had melting point 214–216°, and was recrystallised twice from a mixture of ethanol and water to give pure 2-(4-chloro-2-methylphenoxy)ethylguanidine sulphate, melting point 221–222°.

Example 22

A mixture of 2-chloro-6-methylphenol (100 g.) and 1,2-dibromoethane (158 g.) in water (150 ml.) was stirred and heated to reflux during the slow, dropwise addition of a solution of sodium hydroxide (30.8 g.) in water (75 ml.). Stirring and heating were continued for a total of six hours and the reaction mixture was worked up in the usual way to give 1-bromo-2-(2-chloro-6-methylphenoxy)-ethane, boiling point 88–92°/0.05 mm.

A mixture of this ethane (41.1 g.) and potassium phthalimide (52.5 g.) in dimethylformamide (40 ml.) was stirred and heated to 150° for 2 hours. The cooled reaction mixture was poured into water and extracted exhaustively with chloroform. The combined, dried chloroform extracts yielded a thick oil which crystallised from ethanol to give the phthalimide derivative, melting point 92–93°. This compound (19 g.) in ethanol (150 ml.), was converted, in the usual way, with hydrazine hydrate (11.4 ml.), to 1-amino-2-(2-chloro-6-methylphenoxy)-ethane, boiling point 146–148°/14 mm.

This amine (4 g.) was treated with a solution of S-methylthiouronium sulphate (3 g.) in hot water (15 ml.), and the mixture warmed on a steam-bath for 70 minutes. The reaction mixture was allowed to stand at 0° for one hour and the resulting crystalline product removed and dried in vacuo; it had melting point 186–193°. Two recrystallisations from a mixture of ethanol and water gave pure 2-(2-chloro-6-methylphenoxy)ethylguanidine sulphate, melting point 191–195°.

Example 23

1-bromo-2-(2,5-dimethylphenoxy)ethane was converted, essentially as described in the second part of Example 22, to 1-amino-2-(2,5-dimethylphenoxy)ethane, boiling point 133–136°/10 mm.

This amine (6.6 g.), by reaction with S-methylthiouronium sulphate (5.55 g.) in the usual manner, was converted to 2-(2,5-dimethylphenoxy)ethylguanidine sulphate, melting point 226–228°, after recrystallisation from a mixture of ethanol and water.

Example 24

By the methods described in Example 23, 1-bromo-2-(3-nitrophenoxy)ethane was converted to 1-amino-2-(3-nitrophenoxy)ethane, boiling point 120–123°/0.01 mm., and thence to 2-(3-nitrophenoxy)ethylguanidine sulphate, melting point 219–220°.

Example 25

A mixture of 3-methoxyphenol (90 g.) and 1,2-dibromoethane (164.4 g.) in ethanol (164 ml.) was stirred and heated to reflux during the slow, dropwise addition of a solution of sodium hydroxide (31.9 g.) in water (145 ml.). Stirring and heating were continued for a total of 6 hours and the mixture was worked up in the usual way to give 1-bromo-2-(3-methoxyphenoxy)ethane, boiling point 160–174°/12 mm.

This ethane was converted, by the methods of the above examples, to 1-amino-2-(3-methoxyphenoxy)ethane, boiling point 152–154°/12 mm. and thence to 2-(3-methoxyphenoxy)ethylguanidine sulphate, melting point 140–146°, after recrystallisation from ethanol.

In Examples 26 to 30, the methods employed were essentially as described in the relevant parts of the preceding examples, the physical constants of hitherto undescribed compounds being given.

Example 26

1-bromo-3-(4-chloro-2-isopropyl-5-methylphenoxy)-propane, boiling point 123–124°, was obtained from the reaction between 1,3-dibromopropane and 4-chloro-2-isopropyl-5-methylphenol in the presence of aqueous sodium hydroxide. The propane was converted to 1-amino-3-(4-chloro-2-isopropyl-5-methylphenoxy)propane, boiling point 105–108°/0.02 mm. which reacted with S-methylthiouronium sulphate to give 3-(4-chloro-2-isopropyl-5-methylphenoxy)propylguanidine sulphate, melting point 143–145°, after recrystallisation from ethanol.

Example 27

1-bromo-2-(2,6-di-isopropylphenoxy)ethane, boiling point 120°/12 mm., obtained from the reaction between 2,6-di-isopropylphenol and 1,2-dibromoethane, was converted to 1-amino-2-(2,6-di-isopropylphenoxy)ethane, boiling point 161–162°/20 mm. This amine was converted to 2-(2,6-di-isopropylphenoxy)ethylguanidine sulphate, melting point 260–262°, after recrystallisation from a mixture of ethanol and water.

Example 28

1-amino-2-(3,5-dimethylphenoxy)ethane, boiling point 134–136°/8 mm., obtained from the corresponding bromo-compound, was converted to the guanidine. Pure 2-(3,5-dimethylphenoxy)ethylguanidine sulphate had melting point 195–204°, after recrystallisation from a mixture of ethanol and water.

Example 29

1-amino-2-(3,4-dimethylphenoxy)ethane, boiling point 136–137°/8 mm., obtained from the corresponding bromo-compound, was converted to 2-(3,4-dimethylphenoxy)-ethylguanidine sulphate, melting point 195–200°, after recrystallisation from a mixture of ethanol and water.

Example 30

1-bromo-3-(3-methylphenoxy)propane, boiling point 144–148°/10 mm., obtained from the reaction between 3-methylphenol and 1,3-dibromopropane, was converted to 1-amino-3-(3-methylphenoxy)propane, boiling point 139–140°/10 mm. This amine reacted with S-methylthiouronium sulphate to give 3-(3-methylphenoxy)propylguanidine sulphate, melting point 152–156° after recrystallisation from a mixture of ethanol and water.

Example 31

Tablets (0.555 g.) for a specific sympatholytic action, and containing 2-(3-methylphenoxy)ethylguanidine sulphate were made by mixing the salt (0.25 g.) in a fine powder with lactose (0.25 g.) and starch (0.05 g.), granulating the mixture with alcohol or alcoholic polyvinyl pyrrolidone or a mixture of equal parts of alcohol and water, drying the granules at 40°, adding magnesium stearate (0.005 g.) as a lubricant and compressing the mixture.

Example 32

Tablets (0.505 g.) for a specific sympatholytic action and containing 2-(3-methylphenoxy)ethylguanidine sulphate were made by granulating the salt (0.5 g.) in a fine powder with equal parts of alcohol and water. Magnesium stearate (0.005 g.) as a lubricant was added, and the mixture compressed directly.

Example 33

Injection solutions for a specific sympatholytic action and containing 2-(3-methylphenoxy)ethylguanidine sulphate in water for injection (0.2 g. per ml.) were made by autoclaving the solution at 15 lb. steam pressure for 30 minutes in unit dose ampoules or multidose containers. For the latter, the water for injection preferably contained benzyl alcohol (1.0%), phenol (0.5%) or chlorocresol (0.1%).

Example 34

A dispersible powder for anthelmintic action was prepared by milling together in a ball-mill the following ingredients:

| | Parts |
|---|---|
| 2-(4-chloro-3,5-dimethylphenoxy)ethylguanidine sulphate | 90.0 |
| Calcium silicate | 9.8 |
| Cetrimide or polyoxyethylene sorbitan mono-oleate | 0.2 |

This dispersible powder was suitable for use in:

(a) A draft, by stirring in water (1.5 g. in 100 ml);
(b) A drench for animals, by stirring in water (7.5 g. in 60 ml.);
(c) Hard gelatin capsules (500 mg. in each capsule); and
(d) Soft gelatin capsules (500 mg. in each capsule).

Example 35

Tablets for anthelmintic action were prepared as follows:

| | Mg./tablet |
|---|---|
| 2-(4-chloro-3,5-dimethylphenoxy)ethylguanidine sulphate | 433.0 |
| Lactose | 200.0 |
| Starch | 50.0 |
| Polyoxyethylene sorbitan mono-laurate | 10.0 |

The salt was granulated with 5% starch mucilage containing the laurate. The granules were sifted, dried at 45–55° and sifted again. The granules were mixed with the magnesium stearate and the rest of the starch. The mixture was compressed into tablets.

We claim:

1. A method for the treatment of infestations of nematodes which comprises the administration to the infected host of a therapeutically acceptable acid addition salt of a compound of the formula

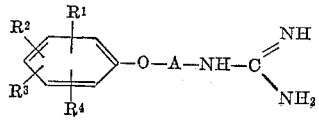

wherein $R^1$ is selected from the class consisting of methyl and isopropyl groups; $R^2$ is selected from the class consisting of hydrogen and chlorine atoms; $R^3$ and $R^4$ are each selected from the class consisting of hydrogen atom and methyl group and A is an alkylene chain having from 2 to 3 carbon atoms.

2. A method for the treatment of infestations of nematodes which comprises the administration to the infected host of a therapeutically acceptable acid addition salt of 2-(2-methylphenoxy)ethylguanidine.

3. A method for the treatment of infestations of nematodes which comprises the administration to the infected host of a therapeutically acceptable acid addition salt of 2-(2-isopropylphenoxy)ethylguanidine.

4. A method for the treatment of infestations of nematodes which comprises the administration to the infected host of a therapeutically acceptable acid addition salt of 2-(2-isopropyl-5-methylphenoxy)ethylguanidine.

5. A method for the treatment of infestations of nematodes which comprises the administration to the infected host of a therapeutically acceptable acid addition salt of 2-(2-chlorophenoxy)ethylguanidine.

6. A method for the treatment of infestations of nematodes which comprises the administration to the infected host of a therapeutically acceptable acid addition salt of 2-(4-chloro-3-methylphenoxy)ethylguanidine.

7. A method for the treatment of infestations of nematodes which comprises the administration to the infected host of a therapeutically acceptable acid addition salt of 2-(4-methylphenoxy)ethylguanidine.

8. A method for the treatment of infestations of nematodes which comprises the administration to the infected host of a therapeutically acceptable acid addition salt of 2-(3-chloro-4-methylphenoxy)ethylguanidine.

9. A method for the treatment of infestations of nematodes which comprises the administration of a therapeutically acceptable acid addition salt of 2-(4-chloro-3,5-dimethylphenoxy)ethylguanidine.

10. A method for the treatment of infestations of nematodes which comprises the administration to the infected host of a therapeutically acceptable acid addition salt of 2-(4-chloro-2-isopropyl-5-methylphenoxy)ethylguanidine.

11. A method for the treatment of infestations of nematodes which comprises the administration to the infected host of a therapeutically acceptable acid addition salt of 2-(4-t-pentylphenoxy)ethylguanidine.

References Cited in the file of this patent

UNITED STATES PATENTS

| 2,663,474 | Beaver | Mar. 31, 1953 |
| 2,850,426 | Hereld | Sept. 2, 1958 |
| 2,890,982 | Natt | June 16, 1959 |
| 2,910,403 | Brendel | Oct. 27, 1959 |
| 2,959,616 | Birtwell | Nov. 8, 1960 |
| 2,960,439 | Settlage | Nov. 15, 1960 |